Figure 1:
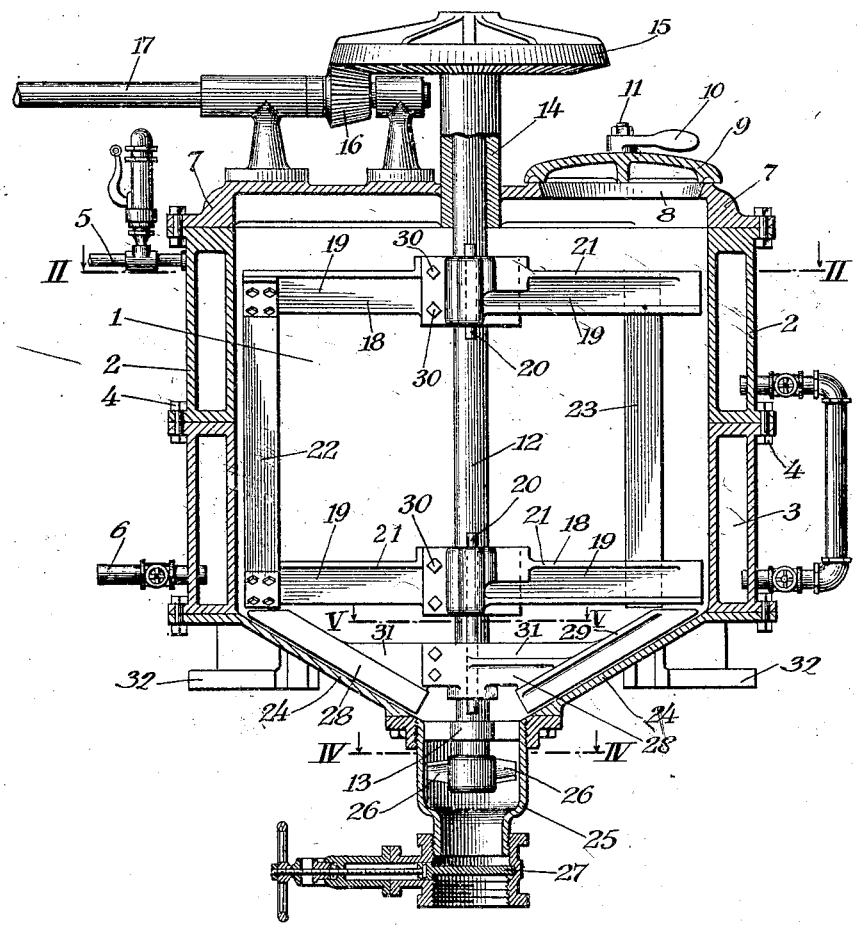

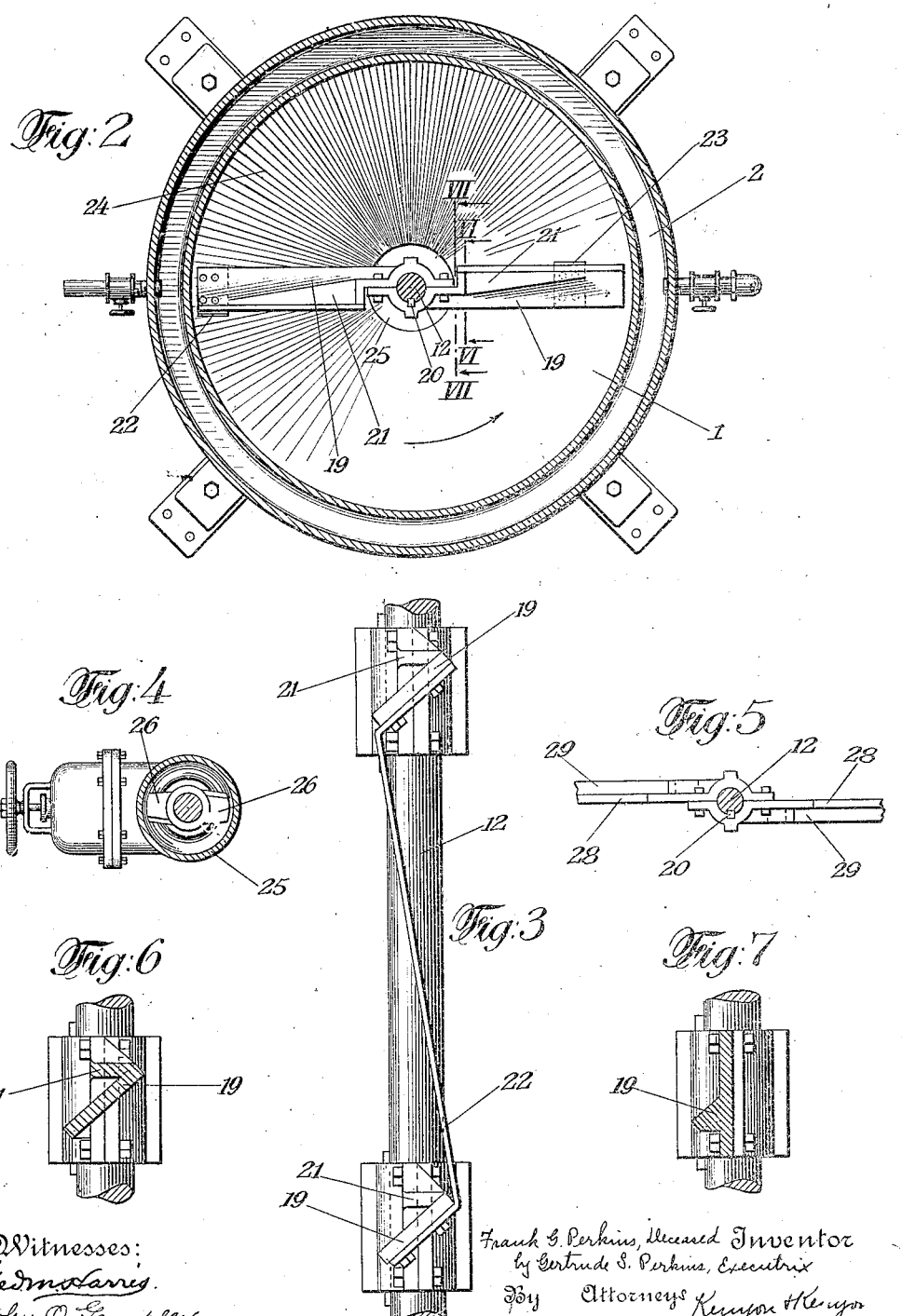

UNITED STATES PATENT OFFICE.

FRANK G. PERKINS, DECEASED, LATE OF LANSDALE, PENNSYLVANIA, BY GERTRUDE S. PERKINS, EXECUTRIX, OF LANSDALE, PENNSYLVANIA, ASSIGNOR TO PERKINS GLUE CO., A CORPORATION OF PENNSYLVANIA.

GLUE-KETTLE.

1,109,143.  Specification of Letters Patent.  Patented Sept. 1, 1914.

Application filed March 4, 1911. Serial No. 612,180.

*To all whom it may concern:*

Be it known that FRANK G. PERKINS, deceased, late of Lansdale, borough of Lansdale, State of Pennsylvania, did invent certain new and useful Improvements in Glue-Kettles, of which the following is a specification.

The invention relates to improvements in glue kettles or glue mixing vessels and various objects of the invention are to provide a kettle or mixing apparatus of simple and cheap construction and an apparatus which is also most efficient and economical in operation and also which is especially applicable and advantageous in the preparing or mixing of vegetable glue.

Further objects, features and advantages will more clearly appear from the detailed description given below taken in connection with the accompanying drawings which form a part of this specification.

Referring to the drawings, Figure 1 is a vertical section through the apparatus. Fig. 2 is a horizontal section on the line II—II of Fig. 1. Fig. 3 is an edge view of the stirrer shown in Figs. 1 and 2. Fig. 4 is a horizontal section taken on the line IV—IV of Fig. 1. Fig. 5 is a horizontal section of a detail taken on the line V—V of Fig. 1. Fig. 6 is a vertical section of a detail taken on the line VI—VI of Fig. 2, and Fig. 7 is a similar view taken on the line VII—VII of Fig. 2.

Referring to the drawings, 1 represents a main container having cylindrical side walls with steam heating jackets 2 and 3. The steam jacket 2 is placed above the jacket 3 and the two bolted together by means of bolts 4. Steam is admitted to the jackets 2 and 3 by means of pipes 5 and 6. A top 7 is bolted to the container and is provided with a man hole opening 8 over which is a man hole cover 9 secured by arms on latches 10 swinging on bolts 11. Extending vertically through the center of the container 1 is a shaft 12 journaled in bearing 13 at the bottom and bearing 14 at the top. Secured to the top of the shaft 12 is a beveled pinion 15. This meshes with a beveled pinion 16 on a shaft 17 driven from any suitable source of power.

18 represents a stirrer which comprises four similar radial arms 19 extending horizontally, two in one direction from the shaft 12 and two in the opposite direction from the shaft 12, but all in substantially the same plane. The arms 19 are so cast that they may be bolted together in pairs about the shaft 12 as shown in the drawings and keyed to the shaft 12 by means of keys 20. The arms 19 are each inclined or beveled on their underneath side in a direction to tend to force the glue or glue mixture downwardly. The arms are also provided with strengthening ribs 21 which taper off outwardly. Bolted to the outer ends of an upper and lower arm 19 is an upright member 22. The member 22 travels in a circular path near the inside of the container, a small space being left between the member 22 and the inside wall of the container. Bolted to the other upper and lower arm 19 is a second upright member 23. The member 23 runs in a circular path between the shaft 12 or center of the container and the circular path followed by the member 22.

The bottom 24 of the container inclines downwardly toward the center from all sides and in the center of the bottom is an outlet 25. At or in the outlet 25 and secured to the shaft 12 is a member carrying two blades 26, which are tilted or inclined as shown in Figs. 1 and 4 so that they tend to force the glue out through the outlet when the shaft 12 is turned. Below the blades 26 and outlet 25 is a gate valve 27 which is used to shut off or allow of the supply of glue below whenever desired. Also bolted together about the shaft 12 and carried by the stirrer are two members 28 provided with strengthening ribs 29.

The members 28 run near to the bottom 24 and parallel to the same and the incline thereof. The member or members 28 are secured to shaft 12 independently of the arms 19, and the arms 19 may therefore be adjusted to different heights independent of the member or members 29. This may be done by loosening the bolts 30 and moving the arms 19 to the height desired and then tightening the bolts 30. The members 28 are so constructed that they have lugs 31 which extend integrally from the top edges of members 28 and thence to the shaft 12 about which they are bolted.

The kettle is supported by means of lugs 32 integral with the bottom, the lugs 32 being bolted to the floor and the outlet 25 and part of the bottom extending down through the floor to the room below.

The materials for making or preparing the glue are admitted through the opening 8, and the stirrer, etc., acts to thoroughly mix them or stir the glue. The steam jackets will serve to keep the batch at the proper temperature if necessary. After being fully treated the gate valve 27 may be opened and the blades 26 will readily force the glue through the outlet. The particular arrangement of stirrer shown is found especially advantageous in the preparation of vegetable glue and the inclination of the bottom makes more easy the withdrawing of the glue, including the entire batch, from the container.

The particular glue for which this apparatus is especially adapted is the vegetable glue described in U. S. Letters Patent No. 1,020,656 and Reissue Letters Patent No. 13,436. The glue there described is a colloid of great viscosity formed by dissolving starch flour in water and caustic soda, and it apparently contains besides a large proportion of hydrosols an enormous number of nuclei, and owing to its unusually high concentration (about 30%) it is prone to gelatinize. The causes for requiring a specially adapted mixing kettle and the functions of its parts appear to be as follows: As soon as hydrogel particles begin to form a minute weblike structure is created with walls perhaps entirely invisible under a microscope, and as the starch molecule is relatively large, this structure is extensive and will long remain like a fluid. Under the influence of surface tension these sheets of weblike structure roll up into hollow cylinders, etc., and there results a segregation of hydrous hydrogel groups from the remaining hydrosols. In this manner ropy, viscid masses and lumpy gelatinous aggregations are prone to form throughout the glue mass and also to grow and harden by further segregation and addition to the wall structure. When this occurs in this vegetable glue such aggregations collect more or less on the sides and bottom of the container and if allowed to remain for any length of time attach themselves thereto strongly. It is not sufficient to remove these aggregations bodily but they must be desegregated by breaking down the invisible dividing walls and tearing up the ropy structure.

In the apparatus shown and described, the upright member 22 and bottom scrapers 28 and 29 running close to the walls of the container, not only serve to prevent the gelatinous aggregates from collecting, growing and attaching themselves to the side and bottom of the container, but also act to desegregate any such masses as may be formed.

The intermediate stirring member 23 acts to desegregate or prevent segregation in the body of the glue mass by tearing through the segregation walls, liberating the contents of the segregation cylinders, etc., and disintegrating and distributing the fragmentary parts of these walls.

The screw blades 26 operating in the glue outlet act to stir and desegregate the glue in the outlet when the valve 27 is closed, and these screw blades 26 are of such size and shape that they will not pack any solid material (as the starch flour suspended in water) in the outlet when the outlet is closed, but upon opening the valve 27 the blades 26 act to force the glue through the outlet.

Although the improvements have been described in great detail it is not desired that the invention in its broadest aspects be limited to such details except as clearly pointed out in the appended claims, since many changes and modifications may well be made without departing from the spirit of the invention in its broadest aspects.

Having thus fully and clearly described the invention, what is claimed and desired to be secured by Letters Patent, is:

1. A kettle for mixing and dissolving a flour to form glue, comprising a suitable container having a de-segregating mechanism therein embracing a scraper moving adjacent the side of the container for preventing the accumulation of gelatinous material adjacent the side of the container, one or more de-segregating stirring members passing through the body of the glue, and a scraper running adjacent to and parallel to the bottom of the container for preventing the accumulation of suspended flour as sediment, and of gelatinous matter adjacent the bottom and forcing the same up into the path of the other de-segregating members.

2. A kettle for mixing and dissolving a flour to form glue, comprising a suitable container, means therein for de-segregating the glue, said container having an outlet in its bottom, means for opening and closing said outlet, and means at the outlet for stirring the glue in the outlet when the outlet is closed without packing any solid material therein and adapted to force the glue through the outlet when the outlet is open.

3. A kettle for mixing and dissolving a flour to form glue, comprising a suitable container, means therein for de-segregating the glue, said container having an outlet in its bottom, the bottom inclining downwardly toward the outlet, one or more scraping members running parallel to and adjacent the bottom acting to progress the glue toward the outlet as the container is being emptied, means for opening and closing said outlet and means at the outlet for stirring the glue in the outlet when the outlet is closed without packing any solid material therein and adapted to force the glue through the outlet when the outlet is open.

4. A kettle for mixing and dissolving a flour to form glue, comprising a suitable container, means therein for de-segregating the glue, said container having an outlet in its bottom, means for opening and closing said outlet, and a screw in the outlet for stirring the glue in the outlet when the outlet is closed, without packing any solid material therein and adapted to force the glue through the outlet when the outlet is open.

5. A kettle for mixing and dissolving a flour to form glue, comprising a suitable container, means therein for de-segregating the glue embracing a scraper moving adjacent the side of the container for preventing the accumulation of gelatinous material adjacent the side of the container, one or more de-segregating stirring members passing through the body of the glue, and a scraper running adjacent to and parallel to the bottom of the container for preventing the accumulation of suspended flour as sediment, and of gelatinous matter adjacent the bottom and forcing the same up into the path of the other de-segregating members, said container having an outlet in its bottom, means for opening and closing said outlet and a screw in the outlet for stirring the glue in the outlet when the outlet is closed without packing any solid material therein, and adapted to force the glue through the outlet when the outlet is open.

6. A kettle for mixing and dissolving a flour to form glue, comprising a suitable container provided with a heating jacket and having a de-segregating mechanism therein embracing a scraper moving adjacent the side of the container for preventing the accumulation of gelatinous material adjacent the side of the container, one or more de-segregating stirring members passing through the body of the glue, and a scraper running adjacent to and parallel to the bottom of the container for preventing the accumulation of suspended flour as sediment, and of gelatinous matter adjacent the bottom and forcing the same up into the path of the other de-segregating members.

7. A kettle for mixing and dissolving a flour to form glue, comprising a suitable container, provided with a heating jacket and means therein for de-segregating the glue, said container having an outlet in its bottom, the bottom inclining downwardly toward the outlet, one or more scraping members running parallel to and adjacent the bottom acting to progress the glue toward the outlet as the container is being emptied, means for opening and closing said outlet and means at the outlet for stirring the glue in the outlet when the outlet is closed without packing any solid material therein and adapted to force the glue through the outlet when the outlet is open.

In testimony whereof, I have signed my name to this specification in the presence of two subscribing witnesses.

GERTRUDE S. PERKINS,
*Executrix of the estate of Frank G. Perkins, deceased.*

Witnesses:
  R. C. WENDT,
  L. McMILLEN.

---

Copies of this patent may be obtained for five cents each, by addressing the "Commissioner of Patents, Washington, D. C."